United States Patent [19]

Sondrol

[11] Patent Number: 5,579,062
[45] Date of Patent: *Nov. 26, 1996

[54] INTERCHANGEABLE LENS EYEGLASSES WITH TEMPLE RELEASE MECHANISM

[76] Inventor: Larry L. Sondrol, 1585 Mesa Rd., Colorado Springs, Colo. 80904
The term of this patent shall not extend beyond the expiration date of Pat. No. 5,418,580.

[21] Appl. No.: 445,861

[22] Filed: May 22, 1995

Related U.S. Application Data

[63] Continuation-in-part of Ser. No. 270,990, May 5, 1994, Pat. No. 5,418,580.
[51] Int. Cl.⁶ .................... G02C 1/08; G02C 5/00
[52] U.S. Cl. .................... 351/92; 351/90; 351/95; 351/140
[58] Field of Search .................... 351/42, 47, 57, 351/59, 63, 86, 90, 92, 95, 96, 99, 106, 107, 111, 119, 121, 140, 153

[56] References Cited

U.S. PATENT DOCUMENTS

| | | | |
|---|---|---|---|
| 3,229,303 | 1/1966 | Jonassen | 351/92 |
| 4,153,347 | 5/1979 | Myer | 351/90 |
| 4,304,469 | 12/1981 | Solomon | 351/121 |
| 5,418,580 | 5/1995 | Sondrol | 351/47 |

*Primary Examiner*—Hung Xuan Dang
*Attorney, Agent, or Firm*—Moore & Hansen

[57] ABSTRACT

A temple to eye wire release eyeglass frame allows removal and replacement of lenses without the need for specialized tools or manual dexterity. The eyeglass frame includes temples, a wire frame having split sides with upper and lower eye wires. A double cam and two cam blocks fit together, with the temple attached to the double cam, so that when the temples are rotated, the lenses may be removed from the frame. Replacement lenses may be for use as sunglasses, rifle glasses, or simply for using a decorative color for appearance.

16 Claims, 5 Drawing Sheets

INTERCHANGEABLE LENS EYEGLASSES WITH TEMPLE RELEASE MECHANISM

BACKGROUND OF THE INVENTION

This application is a continuation in part of application Ser. No. 08/270,990, filed May 5, 1994 now U.S. Pat. No. 5,418,580.

Application Ser. No. 08/270,990, entitled INTERCHANGEABLE LENS EYEGLASSES WITH PIVOTING TEMPLE RELEASE MECHANISM, filed May 5, 1994, now U.S. Pat. No. 5,418,580 is hereby incorporated by reference.

The present invention relates to the field of eyeglass frames. Specifically, the present invention relates to a metal eyeglass frame providing the user the capability to substitute lenses under changing conditions without the use of tools or specialized dexterity.

Replacement or substitution of eyeglass lenses currently falls into two categories: those mounted in plastic flames, and those mounted in metal frames.

Lens replacement in plastic frames is generally accomplished by heating the frames to the extent that the lenses may be forced out of the mounting groove. This is normally accomplished by personnel skilled in the trade.

Lens replacement in metal frames requires the removal of a miniature screw which releases tension applied by a split frame. The screw fits into a bore created in connecting tabs at the ends of the split eye wires, and at the connecting end of the temple arms. Although there are several instances of prior art facilitating lens removal, all require specialized tools or manual dexterity to accomplish the lens substitution. The need for such tools, equipment or dexterity is considered a drawback to "in the field" substitution of lenses. U.S. Pat. No. 5,418,580 discloses an attachment for metal eyeglass frames which permits the user to replace lenses without the use of optical tools and does not require extraordinary manual dexterity. Since the invention of the subject matter of that application, applicant has discovered several problems with the embodiment therein.

First, the embodiment disclosed in the co-pending application is unwieldy due to its excessive size. Further, the embodiment described therein contains a number of small and intricate parts, which must be specially machined. The more parts that must be machined, the more expensive the attachment becomes. The physical size of the embodiment of the co-pending application cannot be lessened any more than it currently is due to space and structure constraints. It is unlikely that an average eyeglass wearer would find that the added convenience of replaceable lenses outweighs the added expense and bulk of the embodiment of the co-pending application. The co-pending application contains no positive lock holding the temple in the lens holding position. Therefore, the previous embodiment required a pin to hold the temple in its locking position. Replacement of lenses therefore required removal of the locking pin adding time, effort and a requirement for some manual dexterity to replace lenses. Additionally, due to the structural limitations of the embodiment of the co-pending application, the release of the lenses was accomplished at substantially a 90 degree rotation angle of the temple.

SUMMARY OF THE INVENTION

It is an object of the present invention to provide a metal eyeglass frame which allows for the replacement of the lenses without the requirement for specialized tools or dexterity.

It is another object of the present invention to provide a temple to eye wire release apparatus small enough to be placed on the temple of an eyeglass frame without unduly detracting from the aesthetics of the frame.

It is still another object of the present invention to provide a temple to eye wire release apparatus with a selectable lens release angle.

It is yet another object of the present invention to improve the temple to eye wire release mechanism of the U.S. Pat. No. 5,418,580 by decreasing the number of parts as well as the size of the release mechanism.

The present invention accomplishes these objectives by providing a temple to eye wire release mechanism small enough to fit into the current screw bore in the eye wire connecting tabs where the attaching screw of present metal frames is placed.

The present invention provides a metal eyeglass frame and temple, the area of the frame and temple normally accommodating a screw having a central bore therethrough for placement of the components of the attachment and release mechanism. The frames are split into upper and lower eye wires which will be joined by the attachment means. The attachment means includes a double headed cam having two cam heads connected by a central shaft, two cam blocks each having openings sized to accept to half of the double cam, so that when the cam blocks are placed together properly, they will substantially enclose the double cam within the openings, and a retaining clip extending around the cam blocks to urge them toward each other in order to assist in the retaining of the double cam within the cavity created by the joining of the two cam blocks.

Each cam head is eccentrically is shaped so that rotating motion of the cam head will force the cam blocks apart since the distance from the center point of the cam head will vary with the angle at which the cam head is oriented.

One of the cam heads is fixedly attached to the temple. One of the cam blocks is fixedly attached to the bottom eye wire, and the other is attached to the top eye wire and may as well be attached to the temple facade of the upper eye wire. The double cam fits within the cavity created by the cam openings. This cavity is shaped the same as the double cam so that when the two cam blocks are urged toward each other, and the double cam placed therebetween the two cam blocks will retain the double cam within the cavity. A spring steel retaining clip urges the two cam blocks toward each other to resist in the retaining of the double cam within the cavity.

When the temples of the eyeglass frame are in normal wearing position, the cam head position within the cavity created between the cam blocks is such that the eye wire ends are in engaging contact with each other, thereby holding a lens within the lens opening of the eye wire frame. This position is perpendicular to a plane through the metal frame and lens openings. When the temple is rotated in a plane perpendicular to the plane of the frame, the cam head rotates with the temple and forces the cam blocks apart due to the ellipsoidal shape of the double cam.

The shape of the double cam heads may be altered so that the release point of the lens is at substantially any angle. The retaining clip that biases the cam blocks toward each other serves as positive lock to retain the temple in its normal position unless a positive pressure is exerted upon the temple to rotate it to its release position.

These and other objects and benefits of the present invention will become apparent from the following detailed description thereof taken in conjunction with the accompanying drawings, wherein like reference numerals designate like elements throughout the several views.

DESCRIPTION OF THE PREFERRED EMBODIMENT

Figure 1:
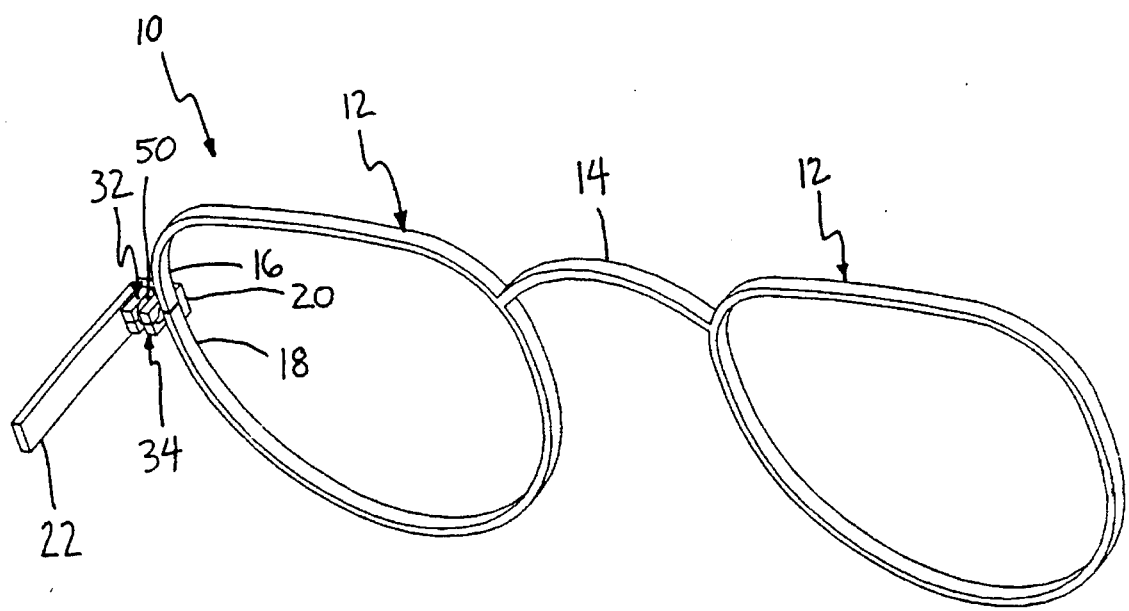
FIG. 1 is a perspective view of an eyeglass frame embodiment of the present invention with the temple in normal wearing position.

Referring now to FIG. 1, the eyeglass frame with temple to eye wire release mechanism 10 may be seen in perspective. The eyeglass frame 10 includes two lens holding sections 12 joined by a bridge 14. The side of each lens holding section 12 distal from bridge 14 is split into an upper eye wire 16 and a lower eye wire 18. Attached to or integrally molded with upper eye wire 16 is temple facade 20. When upper eye wire 16 and lower eye wire 18 are joined together, the lens holding section 12 will retain a lens within the metal wire frame.

Figure 2:
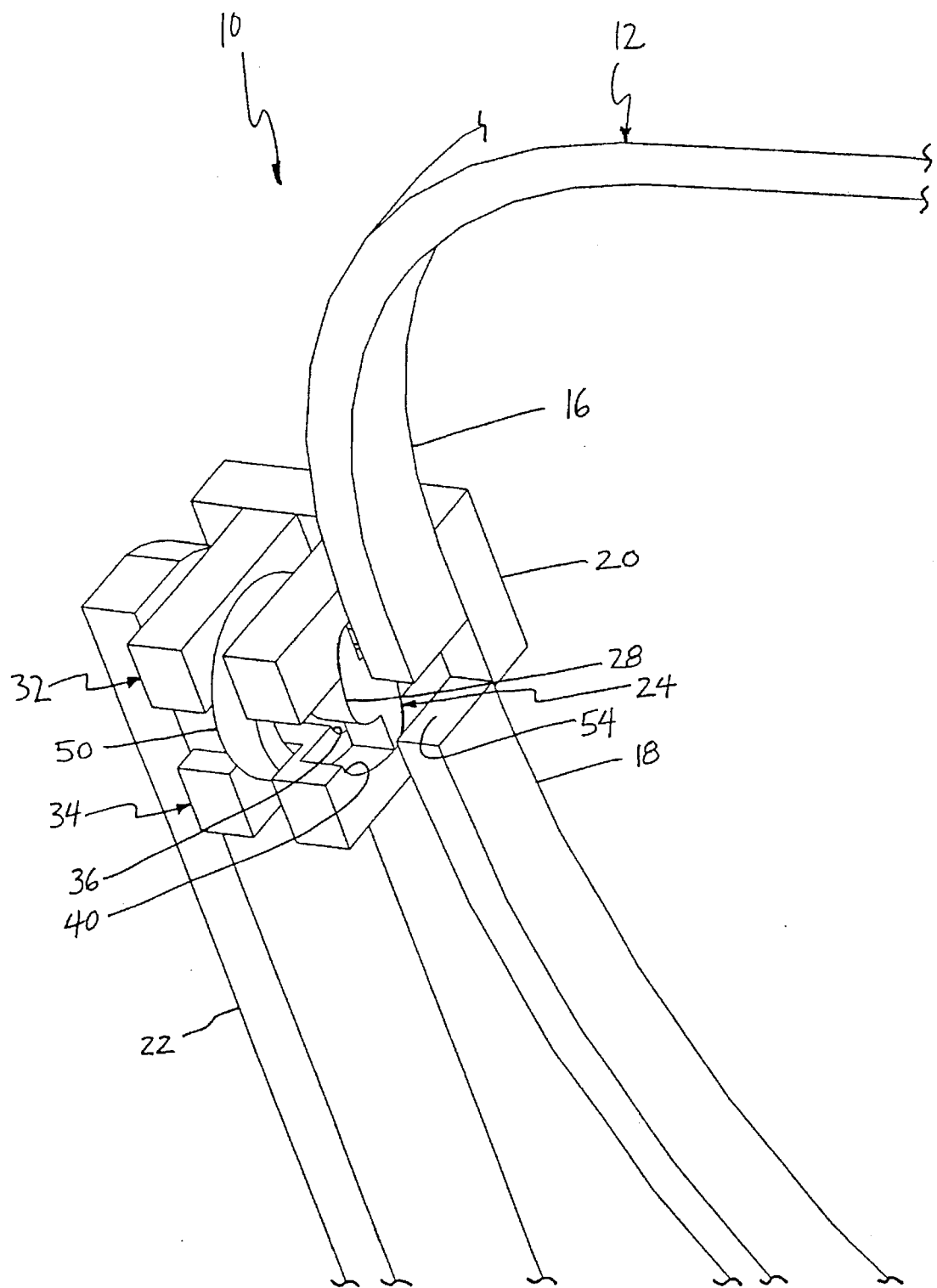
FIG. 2 is an enlarged view of the embodiment of FIG. 1, specifically showing an embodiment of the temple to eye wire release mechanism of the present invention with the temple in a lens releasing position.
Figure 3:
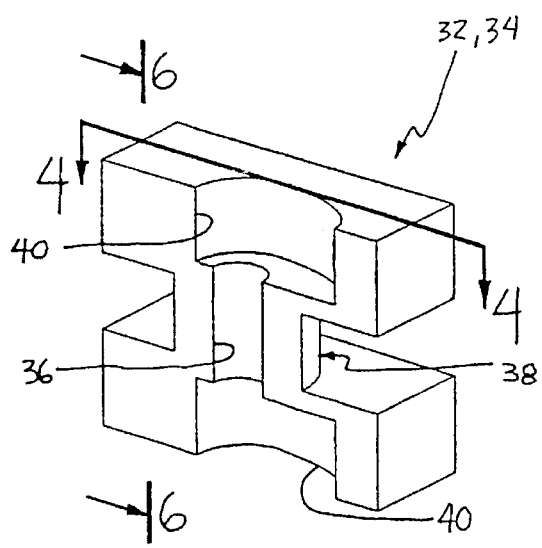
FIG. 3 is an isometric view of a cam block.
Figure 4:
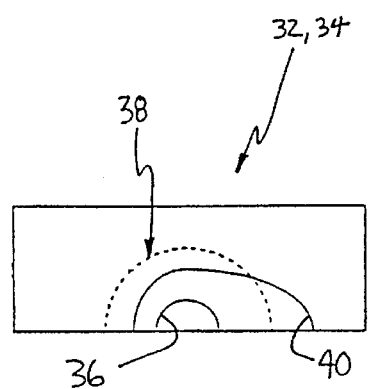
FIG. 4 is a top view of the cam block taken along lines 4—4 of FIG. 3.
Figure 5:
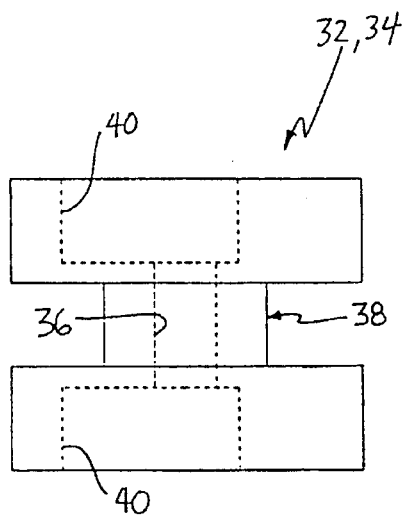
FIG. 5 is a rear elevation view of the cam block of FIG. 3.
Figure 6:
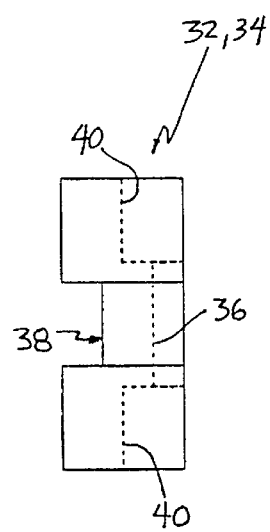
FIG. 6 is a side view of the cam block of FIG. 3 taken along lines 6—6 of FIG. 3.
Figure 7:
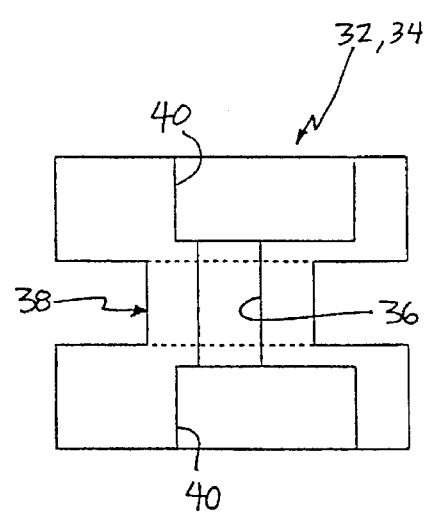
FIG. 7 is a front elevation view of the cam block of FIG. 3.
Figure 8:
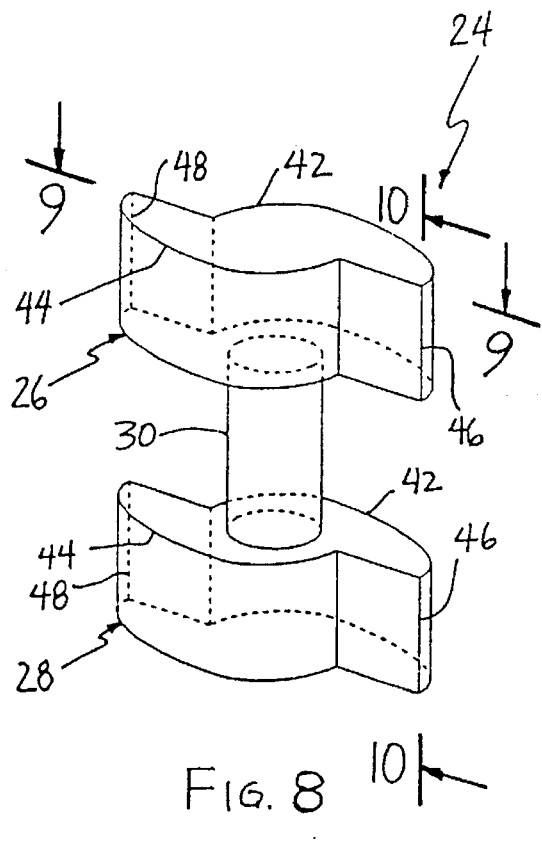
FIG. 8 is an isometric view of the double cam.

FIG. 1 shows temple 22 attached to lens holding section 12 through an attaching means. Referring also to FIG. 2, the attaching means includes a double cam 24 having two opposing cam heads 26 and 28 connected by a shaft 30. One cam head 26 is fixedly attached to temple 22, preferably by welding but any permanent type of affixation will suffice. The attachment means further includes a first or upper cam block 32 and a second or lower cam block 34. Each cam block 32, 34 is identical, so only one cam block 32 will be described in detail.

Referring to FIGS. 3–7, it may be seen that cam blocks 32, 34 are substantially H-shaped. A semi-cylindrical shaft opening 36 extends across a center portion 38 and connects two cam openings 40. Cam openings 40 are substantially half egg shaped ovoid openings. The openings 40 are positioned eccentric to shaft opening 36. The shape of cam openings 40 corresponds to one half the shape of cam heads 26 and 28 of double cam 24.

Figure 9:
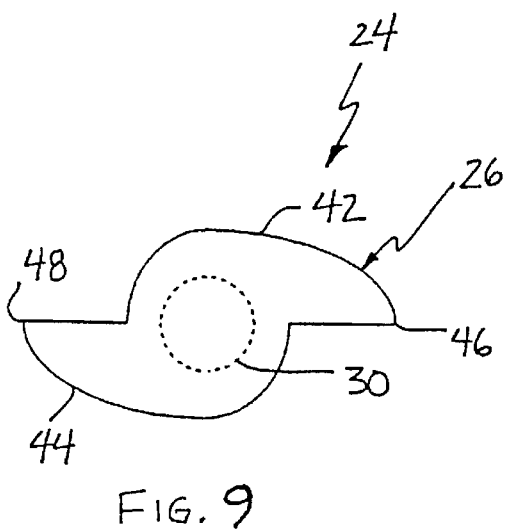
FIG. 9 is a top view of the double cam of FIG. 8 taken along lines 9—9 thereof.
Figure 10:
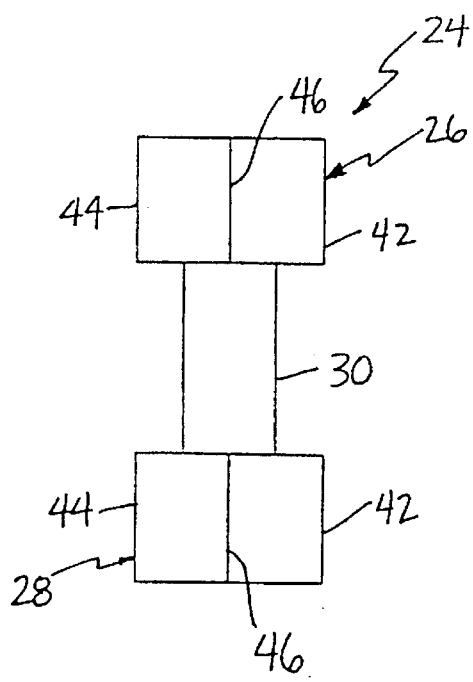
FIG. 10 is an end view of the double cam of FIG. 8 taken along lines 10—10 thereof.
Figure 11:
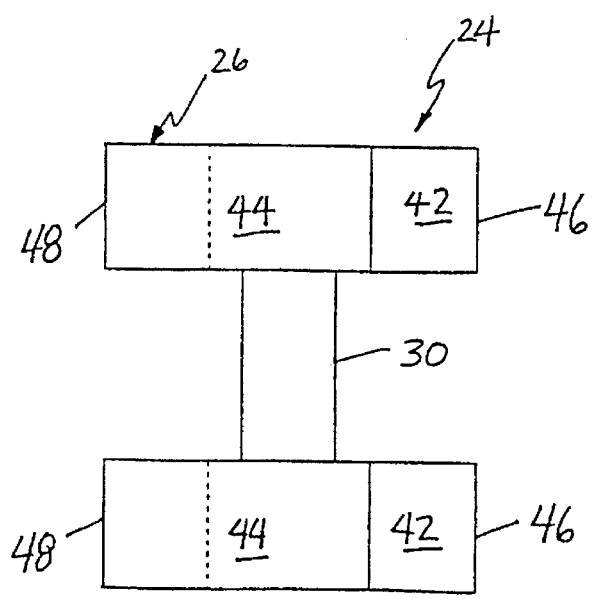
FIG. 11 is a front elevation view of the double cam of FIG. 8.

Referring now to FIGS. 8–11, the double cam 24 may be seen. Double cam 24 includes two cam heads 26 and 28 connected by a cylindrical center shaft 30. Referring to FIG. 9, the cross-sectional shape of cam heads 26 and 28 may be seen. Cam heads 26 and 28 include two substantially half egg shaped portions mounted eccentrically to center shaft 30. The half egg shaped portions 42 and 44 are mounted so that their narrow point ends 46 and 48 are at opposite ends of cam head 26 distal to shaft 30.

Figure 12:
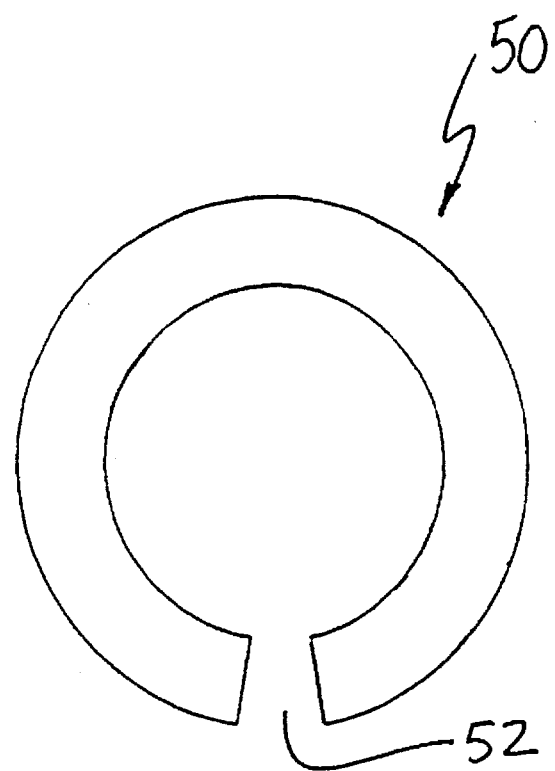
FIG. 12 is an elevation view of the retainer clip.

Referring now to FIG. 12 retainer clip 50 may be seen. Retainer clip 50 is substantially ring shaped with a gap 52 in the clip 50 for placement over center portions 38 of cam blocks 32 and 34 when cam blocks 32 and 34 are in abutting relationship, to bias cam blocks 32 and 34 toward each other. Retainer clip 50 is preferably made from spring steel, although other suitable materials may be used. An important function of retainer clip 50 is that it has enough biasing force that cam blocks 32 and 34 are urged toward each other, yet the motion of cam heads 26 and 28 will be sufficient to overcome the bias and urge cam blocks 32 and 34 apart. Retainer clip 50 must therefore be flexible to allow this separation.

Referring back to FIG. 2, the construction of the attachment means is shown in greater detail. First or upper cam block 32 is fixedly attached to upper eye wire 16 by a weld or other suitable affixing means. First cam block 32 may also be welded to temple facade 20 for further support. Second or lower cam block 34 is fixedly attached to lower eye wire 18 by a weld or other suitable affixing means. Cam head 26 of double cam is fixedly attached to temple 22 by a weld or other suitable affixing means. The alignment of cam head 26 with temple 22 is such that when temple 22 is perpendicular to a vertical plane containing the bridge 14 and lens holding sections 12, the long axes of half egg shaped portions 42 and 44 are also perpendicular to the vertical plane containing bridge 14 and lens holding sections 12. Cam blocks 32 and 34 are positioned so that their cam openings 40 will correspond with the positioning of double cam 24 and cam heads 26 and 28 when double cam 24 is seated within the cavity created by cam openings 40 and shaft openings 36 of cam blocks 32 and 34.

Retainer clip 50 is placed around center portions 38 of cam blocks 32 and 34, thereby urging cam blocks 32 and 34 toward each other. When cam blocks 32 and 34 are in adjoining relationship, temple 22 will be perpendicular to the plane containing bridge 14 and lens holding sections 12, and double cam 24 will be substantially snugly seated in the cavity created by cam openings 40 and shaft openings 36 of cam blocks 32 and 34.

When temple 22 is rotated in a second vertical plane perpendicular to the vertical plane containing bridge 14 and lens holding sections 12, double cam 24 and therefore cam heads 26 and 28 will also rotate. The rotation of cam heads 26 and 28 will force cam blocks 32 and 34 apart, opening an eye wire gap 54 between upper eye wire 16 and lower eye wire 18. It is this separation of the upper and lower eye wires 16 and 18 which allows lenses to be inserted and removed from lens holding sections 12.

The shape of cam heads 26 and 28 may be adjusted or modified so that the gap 54 attains sufficient width to allow for the removal or replacement of lenses at any angle of rotation of temple 22 and therefore double cam 24. The rotation angle of temple 22 with respect to the vertical plane containing bridge 14 and lens holding sections 12 is selectable to any angle for release of the lenses from lens holding sections 12. A release angle of between 30 and 135 degrees is preferable and a release angle of between 60 and 90 degrees is more preferable, with an optimal release angle at 90 degrees. However, it is understood that the release angle may be selected to any angle upon the changing of the shape and orientation of double cam 24 with respect to cam blocks 32 and 34 and openings 36 and 40.

Retainer clip 50 acts as a positive lock by urging cam blocks 32 and 34 toward each other. A positive pressure must be placed on temple 22 in order to separate the upper and lower eye wires 16 and 18, since retainer clip 50 urges cam blocks 32 and 34 toward each other.

Alternatively, some metal frame eyeglasses do not have a bottom eye wire 18. Instead, they have a filament line connected from the upper eye wire 16 around to a connection point near the bridge 14. The present invention could be adapted to be used with such timeless frames by attaching the filament to the bottom cam block 34 of the present invention. The filament could be made of plastic or even metal for added strength. The invention would function the same way as with two eye wires.

It is understood that the double cam and cam block structure for the attachment means may alternatively be replaced with other attachment means, such as a rack and pinion system, without departing from the scope of the invention.

Applications of the present invention include replacement of lenses for changing conditions, such as exchanging clear lenses with sunglass lenses when there is a need. Additionally, for wearers of bifocals or trifocals, problems often occur with choosing an incorrect focal length for certain tasks, or difficulty in maintaining vision through the proper part of the lens. For example, a golfer addressing a golf ball must look down at the ball. In may instances, the golfer is forced to adjust his head position in order to be able to correctly focus on the ball, due to the different focal lengths in different parts of the eyeglass lens. A single focal length lens could be provided for tasks of this nature, to prevent constant strain on the eyes or nerves of the golfer. The same principle is applicable to single focal length tasks of other types, such as extended computer use, or close range reading. A proper single focal length lens could eliminate the eye stress and strain of continually trying to focus through a bifocal or trifocal lens.

These and other objects and benefits of the present invention will become apparent from the following detailed description thereof taken in conjunction with the accompanying drawings, wherein like reference numerals designate like elements throughout the several views.

What is claimed:

1. Eyeglass frame which allows for the removal and replacement of lenses, comprising;
    a pair of temple arms;
    a pair of split frames, each having a medial side and a lateral side, wherein each frame is split on said lateral side to form an upper eye wire and a lower eye wire;
    a bridge attached to and connecting the medial side of each of said split frames; and
    a pair of attachment means for attaching each of said temple arms to said upper and lower eye wires, wherein each said attachment means secures said upper and lower eye wires together when said temple arm is positioned substantially perpendicular to a first vertical plane containing said split frames and said bridge, and wherein each said attachment means allows said upper and lower eye wires to be separated when said temple arm is rotated to a predetermined angle to said first vertical plane and in a second substantially vertical plane extending through said temple arm.

2. An eyeglass frame as described in claim 1 wherein each of said attachment means comprises:
    a double cam having two cam heads connected by a shaft therebetween, one of said cam heads fixedly attached to an end of said temple;
    a first and a second cam block, each said cam block having a shaft opening and a pair of cam openings, said openings sized to receive said double cam, whereby when said double cam is placed in said openings, said cam blocks substantially enclose said double cam, said first cam block fixedly attached to said lower eye wire, and said second cam block fixedly attached to said upper eye wire.

3. An eyeglass frame as described in claim 2, wherein each said upper eye wire has a temple facade attached thereto, and wherein said second cam block is additionally fixedly attached to said temple facade.

4. An eyeglass frame as described in claim 2, and further comprising:
    means for biasing said upper and said lower eye wires toward each other to hold said double cam therebetween.

5. An eyeglass frame as described in claim 4, wherein said biasing means comprises:
    a substantially C-shaped retainer clip, said retainer clip extending around said cam blocks about said shaft openings.

6. An eyeglass frame as described in claim 1, wherein said predetermined angle is within the range of 30–135 degrees.

7. An eyeglass frame as described in claim 1, wherein said predetermined angle is within the range of 60–90 degrees.

8. An eyeglass frame as described in claim 1, wherein said predetermined angle is substantially 90 degrees.

9. An eyeglass frame temple to eye wire release mechanism, comprising:
    a main frame comprising two lens holding sections connected by a bridge, each said section having a side distal to said bridge, and being split at said distal side into upper and lower eye wires;
    a pair of temples; and
    means for attaching one of said temples to each said distal side, wherein said attaching means positively locks said upper and lower eye wires together when said temple is substantially perpendicular to a first vertical plane containing said main frame, and wherein said attaching means separates said upper and lower eye wires upon rotation of said temple in a second vertical plane substantially perpendicular to said first vertical plane to a predetermined angle relative to said first vertical plane.

10. An eyeglass frame as described in claim 9, wherein said attaching means comprises:
    a double cam having two cam heads connected by a shaft therebetween, one of said cam heads fixedly attached to an end of said temple; and
    a first and a second cam block, each said cam block having a shaft opening and a pair of cam openings, said openings sized to receive said double cam, whereby when said double cam is placed in said openings said cam blocks substantially enclose said double cam, said first cam block fixedly attached to said lower eye wire, and said second cam block fixedly attached to said upper eye wire.

11. An eyeglass frame as described in claim 10, and further comprising:
    means for positively biasing said first and said second cam blocks together.

12. An eyeglass frame as described in claim 11, wherein said biasing means is a substantially C-shaped retainer clip that extends around said cam blocks about said shaft openings.

13. An eyeglass frame as described in claim 12, wherein said retaining clip is constructed of spring steel.

14. An eyeglass frame as described in claim 9, wherein said predetermined angle is within the range of 30–135 degrees.

15. An eyeglass frame as described in claim 9, wherein said predetermined angle is within the range of 60–90 degrees.

16. An eyeglass frame as described in claim 9, wherein said predetermined angle is substantially 90 degrees.

* * * * *